US010423449B2

(12) United States Patent
Bhageria et al.

(10) Patent No.: US 10,423,449 B2
(45) Date of Patent: Sep. 24, 2019

(54) ALLOCATING TASKS IN A COMPUTING ENVIRONMENT

(71) Applicant: International Business Machines Corporation, Armonk, NY (US)

(72) Inventors: Gopal K. Bhageria, Kolkata (IN); Pooja Malik, New Delhi (IN); Sathya Santhar, Chennai (IN); Vikram Yadav, Bankok (TH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 114 days.

(21) Appl. No.: 15/817,850

(22) Filed: Nov. 20, 2017

(65) Prior Publication Data
US 2019/0155643 A1 May 23, 2019

(51) Int. Cl.
*G06F 9/48* (2006.01)
*H04L 9/00* (2006.01)

(52) U.S. Cl.
CPC .......... *G06F 9/4881* (2013.01); *H04L 9/008* (2013.01)

(58) Field of Classification Search
None
See application file for complete search history.

(56) References Cited

U.S. PATENT DOCUMENTS

| 2006/0028677 A1* | 2/2006 | Isshiki | G06F 3/1222 358/1.15 |
|---|---|---|---|
| 2013/0067090 A1 | 7/2013 | Batrouni et al. | |
| 2013/0191539 A1 | 7/2013 | Sailer et al. | |
| 2016/0057073 A1 | 2/2016 | Steinder et al. | |
| 2016/0380979 A1* | 12/2016 | Dow | H04L 63/0428 713/168 |
| 2017/0277906 A1* | 9/2017 | Camenisch | G06F 21/6227 |

(Continued)

OTHER PUBLICATIONS

Chunwang Zhang et al., "Tagged-MapReduce: A General Framework for Secure Computing with Mixed-Sensitivity Data on Hybrid Clouds", 2014 14th IEEE/ACM International Symposium on Cluster, Cloud and Grid Computing, 2014, all pages.

(Continued)

*Primary Examiner* — Philip Wang
(74) *Attorney, Agent, or Firm* — Law Offices of Ira D. Blecker, P.C.

(57) ABSTRACT

Method of allocating tasks in a computing environment including: receiving a software application having tasks for processing; splitting the software application into the tasks; selecting a task for processing in a first computing environment without encryption, a second computing environment with homomorphic encryption or a third computing environment without encryption based on the following algorithm: analyzing the tasks for the presence of a security marker indicating a security level of the tasks; when there is no security marker, selecting the task for processing in the least costly of first computing environment without encryption or the third computing environment without encryption; and when the security marker is medium or high and the processing of the task involves any computation, selecting the task for processing in the least costly of the second computing environment with homomorphic encryption or the third computing environment.

20 Claims, 5 Drawing Sheets

(56) References Cited

U.S. PATENT DOCUMENTS

2018/0139054 A1* 5/2018 Chu .................. H04L 9/3247
2019/0050245 A1* 2/2019 Bhageria ............ G06F 9/45558

OTHER PUBLICATIONS

Kehuan Zhang et al., "Sedic: Privacy-Aware Data Intensive Computing on Hybrid Clouds", 18th ACM conference on Computer and communications security, 2011, all pages.

Mauro Gaggero et al., "A predictive control approach for energy-aware consolidation of virtual machines in cloud computing", [online], [retrieved from the Internet on Sep. 13, 2017], Retrieved from the Internet <URL:http://ieeexplore.ieee.org/document/7040219/?reload=true&arnumber=7040219>, all pages.

Ms. Dharmishtha et al., "Dynamic Splitting of Deadline Constraint Jobs for Parallel Processing in Cloud Environment", Journal of Information, Knowledge and Research in Information Technology, vol. 02, Issue—02, Nov. 12 to Oct. 13, all pages.

Zhibo Cao et al., "Dynamic VM Consolidation for Energy-Aware and SLA Violation Reduction in Cloud Computing", [online], [retrieved from the Internet on Sep. 13, 2017], Retrieved from the Internet <URL: http://ieeexplore.ieee.org/document/6589306/?tp=&arnumber=6589306>, all pages.

A. Bharathi et al., "Profit and energy aware scheduling in cloud computing using task consolidation", [online], [retrieved from the Internet on Sep. 13, 2017], Retrieved from the Internet <URL: http://ieeexplore.ieee.org/document/7033887/?reload=true&arnumber=7033887>, all pages.

Enis Afgan et al., "Scheduling and planning job execution of loosely coupled applications", [online], [retrieved from the Internet on Sep. 13, 2017], Retrieved from the Internet <URL:https://www.researchgate.net/publication/220358940_Scheduling_and_planning_job_execution_of_loosely_coupled_applications>, all pages.

Fahimeh Farahnakian et al., "Utilization Prediction Aware VM Consolidation Approach for Green Cloud Computing", [online], [retrieved from the Internet on Sep. 13, 2017], Retrieved from the Internet <URL: http://ieeexplore.ieee.org/document/7214068/>, all pages.

* cited by examiner

ALLOCATING TASKS IN A COMPUTING ENVIRONMENT

BACKGROUND

The present exemplary embodiments pertain to computing environments, and more particularly to application placement in a hybrid cloud computing environment.

Businesses large and small face a dilemma: build their own IT infrastructure or use a public cloud service. On premise infrastructure requires an upfront investment and lacks the capability of elastic growth, but it offers better visibility and control, security, and performance. Public clouds offer a buy-on-demand model and agility, but leave users with limited control over the infrastructure, security concerns, performance and reliability. Hybrid cloud combines on premise cloud infrastructure with a public cloud service. It allows workloads with strict performance, security, or compliance requirements to be hosted in house where there is complete visibility and control of the infrastructure. Workloads that do not have such requirements may be deployed to either the private or public cloud depending on cost and capacity.

BRIEF SUMMARY

The various advantages and purposes of the exemplary embodiments as described above and hereafter are achieved by providing, according to an aspect of the exemplary embodiments, a computer-implemented method of allocating tasks in a computing environment comprising: receiving a software application for processing, the software application comprising a plurality of tasks; splitting the software application into the plurality of tasks; selecting a task for processing in a first computing environment without encryption, a second computing environment with homomorphic encryption or a third computing environment without encryption, each of the first computing environment without encryption, the second computing environment with homomorphic encryption or the third computing environment without encryption having a cost associated with processing the task, based on the following algorithm: analyzing the plurality of tasks for the presence of a security marker indicating a security level of each of the plurality of tasks; when there is no security marker, selecting the task for processing in the first computing environment without encryption or the third computing environment without encryption, whichever has the least cost associated with it; and when the security marker is medium or high and the processing of the task involves any computation, selecting the task for processing in the second computing environment with homomorphic encryption or the third computing environment, whichever has the least cost associated with it.

According to another aspect of the exemplary embodiments, there is provided a computer program product for allocating tasks in a computing environment, the computer program product comprising a non-transitory computer readable storage medium having program instructions embodied therewith, the program instructions executable by a computer to cause the computer to perform a method comprising: receiving by the computer a software application for processing, the software application comprising a plurality of tasks; splitting by the computer the software application into the plurality of tasks; selecting by the computer a task for processing in a first computing environment without encryption, a second computing environment with homomorphic encryption or a third computing environment without encryption, each of the first computing environment without encryption, the second computing environment with homomorphic encryption or the third computing environment without encryption having a cost associated with processing the task, based on the following algorithm: analyzing the plurality of tasks for the presence of a security marker indicating a security level of each of the plurality of tasks; when there is no security marker, selecting the task for processing in the first computing environment without encryption or the third computing environment without encryption, whichever has the least cost associated with it; and when the security marker is medium or high and the processing of the task involves any computation, selecting the task for processing in the second computing environment with homomorphic encryption or the third computing environment, whichever has the least cost associated with it.

According to a further aspect of the exemplary embodiments, there is provided a system for allocating tasks in a computing environment comprising: a first computing environment without encryption; a second computing environment with homomorphic encryption; a third computing environment without encryption; a non-transitory storage medium that stores instructions; and a processor that executes the instructions to perform the following functions: receive a software application for processing, the software application comprising a plurality of tasks; split the software application into the plurality of tasks; select a task for processing in the first computing environment without encryption, the second computing environment with homomorphic encryption or the third computing environment without encryption, each of the first computing environment without encryption, the second computing environment with homomorphic encryption or the third computing environment without encryption having a cost associated with processing the task, based on the following algorithm: analyze the plurality of tasks for the presence of a security marker indicating a security level of each of the plurality of tasks; when there is no security marker, select the task for processing in the first computing environment without encryption or the third computing environment without encryption, whichever has the least cost associated with it; and when the security marker is medium or high and the processing of the task involves any computation, select the task for processing in the second computing environment with homomorphic encryption or the third computing environment, whichever has the least cost associated with it.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

Figure 1:
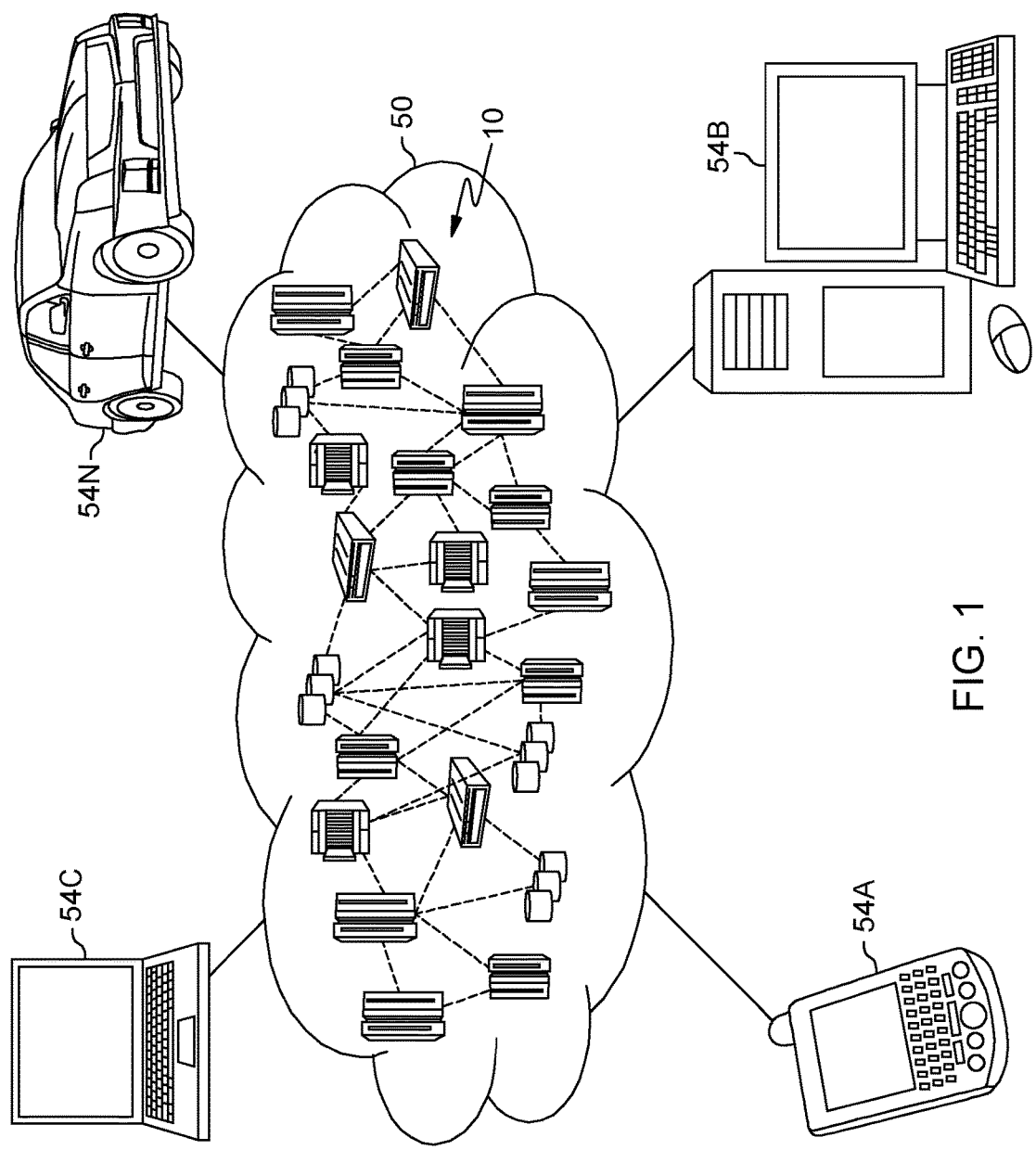
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
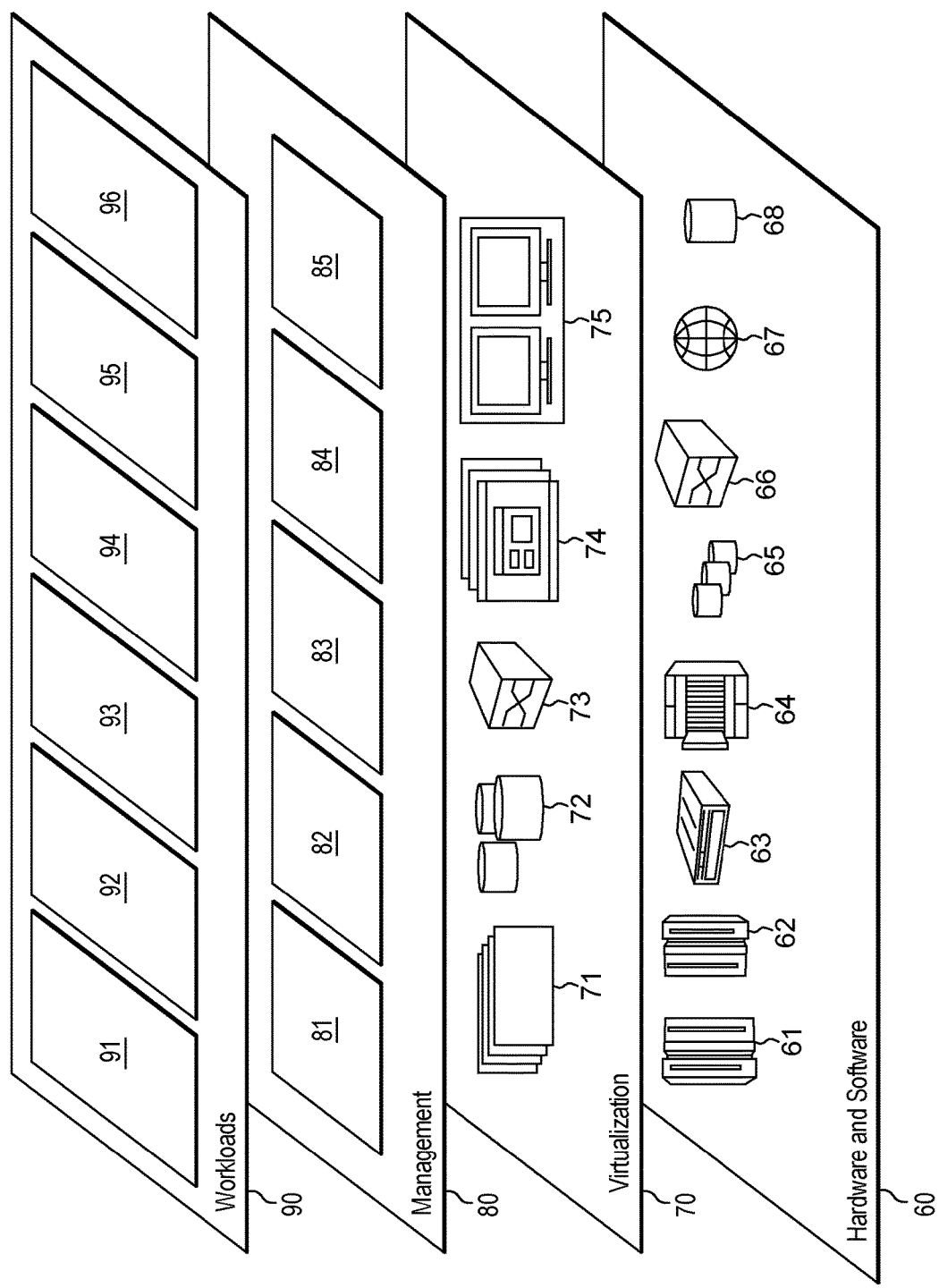
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and splitting jobs into tasks according to coupling factors and security markers.

Virtual environments offer various benefits which may include but not be limited to diverse cluster management, cost effective job execution and workload consolidation. They operate both in private and public cloud configuration and the determination of the right node depends on various SLAs (Service Level Agreements) and cost factors associated to each job. The choice between public and private cloud depends on various factors which may include cost of operation, security, transition time for loosely coupled jobs and so on. When running on a public cloud, security is of more concern when the data is exposed to the external world. To enhance the security, encrypted data may be sent to the public cloud and the public cloud may decrypt the data with an asymmetric key, perform the operations on the data and then send back the encrypted results. The other more secure way to send data to the public cloud is through homomorphic encryption mechanisms like lattice cryptography which enables the public cloud to work on encrypted data.

Homomorphic encryption is a form of encryption that allows computations to be carried out on ciphertext, thus generating an encrypted result which, when decrypted, matches the result of operations performed on the plaintext. That is, a homomorphic encryption scheme is a cryptosystem that allows computations to be performed on data without decrypting it.

Homomorphic encryption enables the construction of programs for any desirable functionality, which can be run on encrypted inputs to produce an encryption of the result. Since such a program need never decrypt its inputs, it can be run by an untrusted party without revealing its inputs and internal state.

Homomorphic encryption may be partially, somewhat or fully homomorphic.

Partially homomorphic encryption (PHE) schemes are homomorphic with respect to only one type of operation, for example, addition or multiplication.

Somewhat homomorphic encryption (SWHE) supports homomorphic operations with respect to multiple operations, for example, addition and multiplication, but not all operations. For purposes of this application, somewhat homomorphic encryption is inclusive of partially homomorphic encryption.

Fully homomorphic encryption (FHE) supports an unbounded number of homomorphic operations on ciphertexts and is far more powerful than PHE and SWHE.

In the exemplary embodiments, running a job in a cloud environment requires an analysis of many parameters around the cost factor of the job and security of the job. There is always a need to balance between cost and security and, in some cases, one is preferred over the other. Rather than performing this analysis per job basis, the exemplary embodiments focus on tasks within the jobs which may be loosely coupled.

By loosely coupled, it is meant that loosely coupled tasks may be executed independently of each other and may be handled in parallel. Other tasks may be dependent such that they have to be executed in order. Tasks that must be executed in order are tightly coupled tasks.

One aspect of the exemplary embodiments is that a user may define and associate security markers within the jobs which when executed on a virtual machine environment, the markers will be transparent to the job scheduler/analyzer 116. The job scheduler/analyzer 116 may split the jobs into tasks based on the coupling factors and the security markers.

Another aspect of the exemplary embodiments is that upon receiving each job, a cost of operation may be calculated by the job scheduler/analyzer 116 for executing each of the split jobs in each environment (local computing system, public cloud and private cloud) and the transition time between the coupled tasks when operated in a hybrid environment. The hybrid environment may be a combination of local computing system, public cloud and private cloud or may be just a combination of public and private cloud environment. If outsourcing of the tasks is needed and if security markers are present, the tasks are analyzed to see if the tasks may be completed with SWHE or FHE.

A further aspect of the exemplary embodiments is that if both SWHE and FHE are supported, the best encryption is decided by the job scheduler/analyzer 116 based on the level of security markers associated with the tasks. If cost involved in running the clusters is less in private cloud when compared to combined cost of homomorphic encryption and public cloud operation, then the private cloud is preferred. If the public cloud plus homomorphic encryption is less costly, the cost of FHE versus SWHE in the public cloud given the level of the security marker is calculated.

Figure 3:
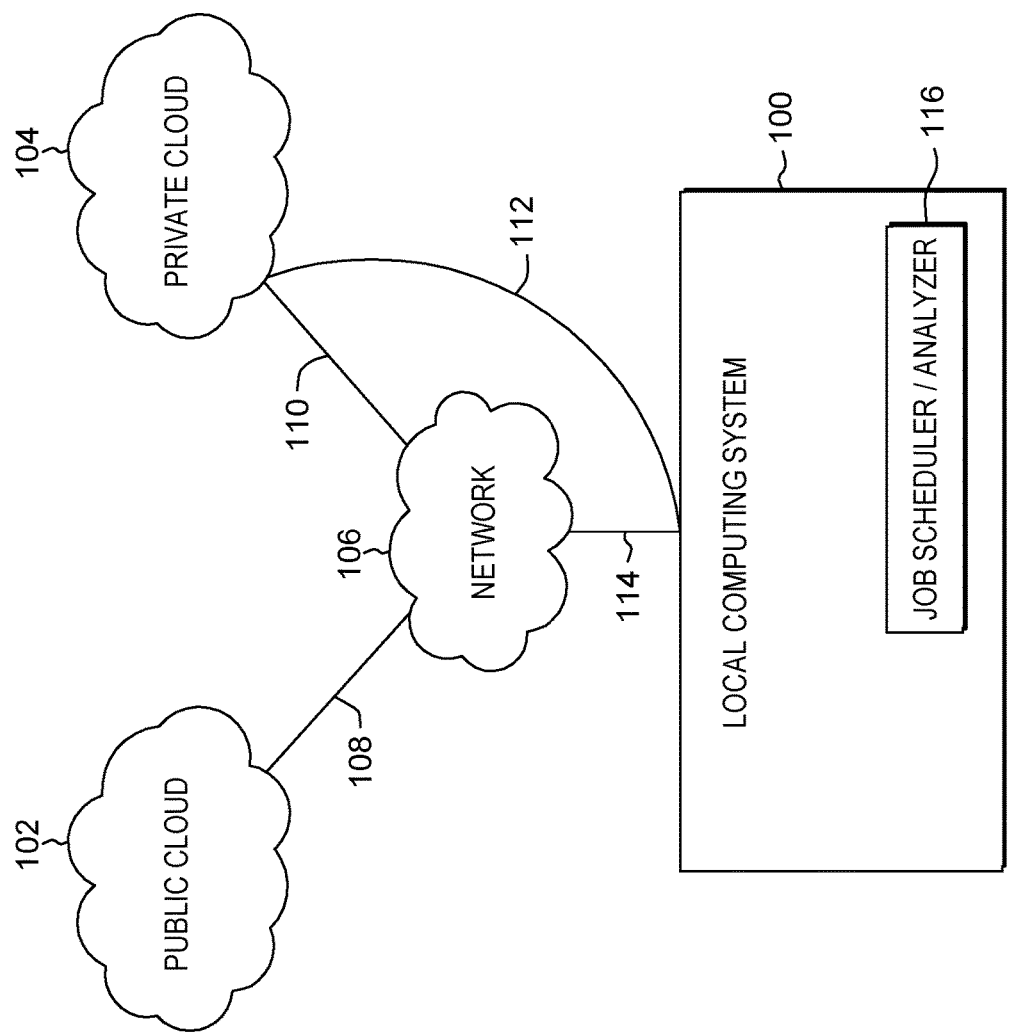
FIG. 3 depicts a hybrid cloud environment.

Referring now to FIG. 3, there is illustrated a hybrid cloud environment envisioned by the exemplary embodiments. An organization's internal information technology resources are indicated as local computing system 100. The local computing system 100 may include a job scheduler/analyzer 116 to perform the tasks previously described. The job scheduler/analyzer 116 may be a software module that is capable of dividing the job into tasks and also checking for the presence of a security marker. The organization may decide to outsource computing tasks to a public cloud 102 and/or a private cloud 104.

The local computing system 100 may connect to public cloud 102 through a network 106 such as the Internet, communication link 114 from the local computing system 100 to the network 106 and communication link 108 from the network 106 to public cloud 102.

In addition or as an alternative, the local computing system 100 may connect to private cloud 104 through a network 106 such as the Internet, communication link 114 from the local computing system 100 to the network 106 and communication link 110 from the network 106 to private cloud 104. Since the private cloud 104 may actually be on the organization's premises, the local computing system 100 may connect directly to the private cloud 104 through communication link 112 without going through the network 106.

Figure 4:
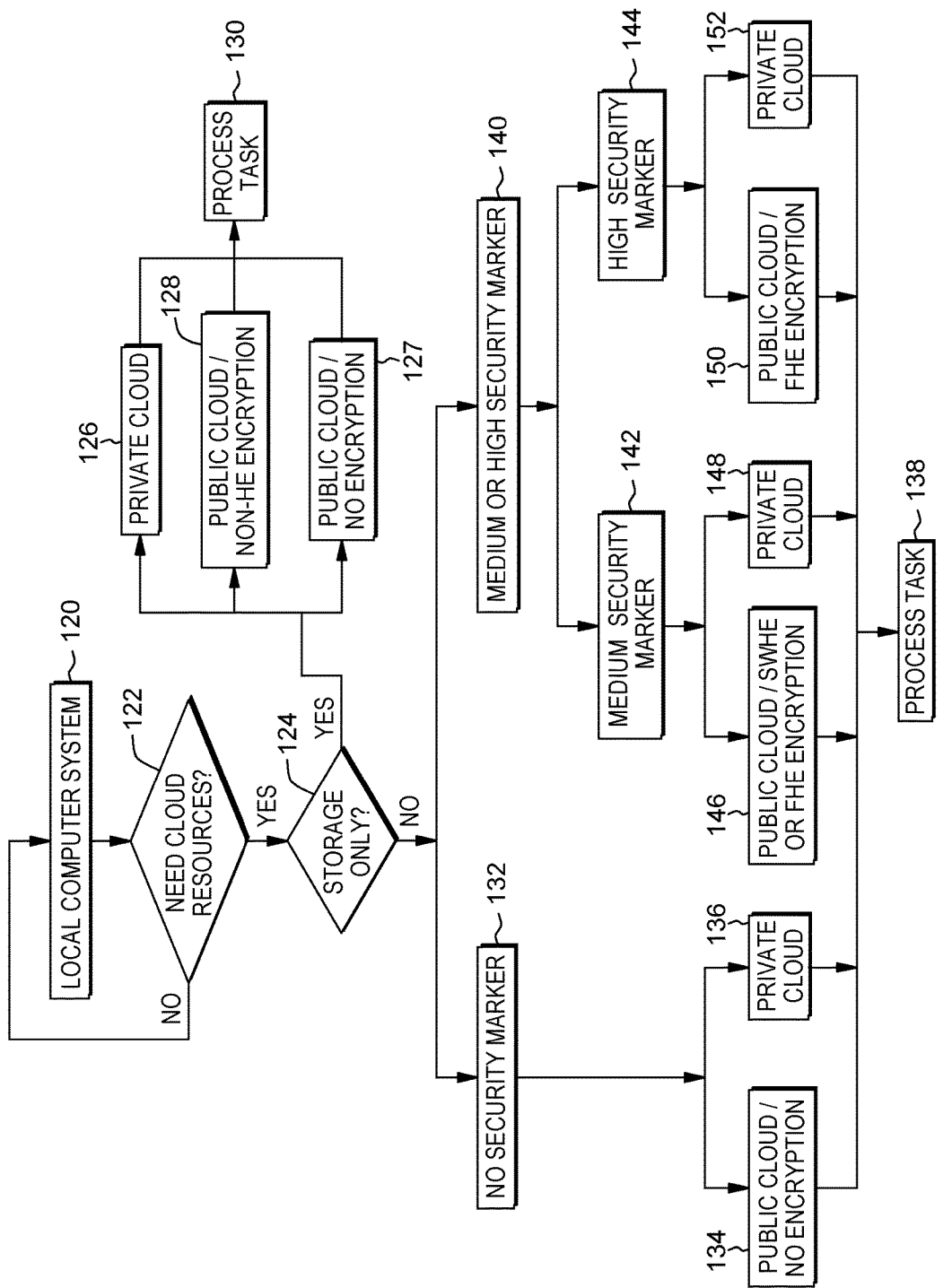
FIG. 4 depicts a flow chart for dividing tasks between a public cloud and a private cloud.

Referring now to FIG. 4, there is depicted a flow chart for dividing tasks between a public cloud and a private cloud based on cost and security markers embedded within the tasks. It should be understood that each loosely coupled task may be independently evaluated for cost and security to determine which cloud and security encryption is best suited for the task. Several tasks may be grouped together into clusters if they have similar costs and security requirements or if they are dependent. Tightly coupled tasks may be handled as a cluster.

Initially, tasks may be selected for processing in the local computing system 100, box 120. The tasks may be evaluated to determine if outsourcing the tasks to the public cloud 102 and/or the private cloud 104 is necessary or more cost effective than processing the tasks on the local computing system 100.

The decision is made whether cloud resources are needed, box 122. If cloud resources are not needed the flow follows the "NO" path back to select the local computing system 100 whereas if cloud resources are needed, the flow follows the "YES" path.

If the tasks involve only storage of data, box 124, then the "YES" path is followed. Regardless of the security marker, the data may be stored in the private cloud 104 without encryption so that the private cloud may be selected, box 126. If the data is to be secured, the data may be stored in the public cloud 102 with encryption other than SWHE or FHE so that the public cloud may be selected with non-homomorphic encryption, box 128, or in the private cloud 104 without encryption, whichever solution is most cost effective. Since the data will only be stored in the public cloud 102 and not used for computation, then the data will not need to be decrypted. Accordingly, non-homomorphic encryption should be sufficient for the storage of data in the public cloud 102.

If the data is unsecured, the data may be stored in the private cloud 104 without encryption or in the public cloud without encryption so that the public cloud may be selected with no encryption, box 127, whichever is most cost effective. Costs involved here may include the cost to move the data from the local computing system 100 to the public cloud 102 or the private cloud 104 plus the cost of using the resources in the public cloud 102 or the private cloud 104 for storage. After storage in either of the public cloud 102 or the private cloud 104 is selected, the tasks may be processed by storing the data, box 130.

If the tasks involve any computation of data, box 124, then the "NO" path is followed.

The tasks are examined by the job scheduler/analyzer 116 in the local computing system 100 to see if there is a security marker. There may be no security marker or there may be a security marker to denote the data as being unsecured or secured, respectively. Further, secured data may be further divided into medium security (with a medium security marker) and high security (with a high security marker). Medium security data may be data that is confidential. Medium security data must be handled in a private cloud or a public cloud with SWHE or FHE. High security data is a user's most sensitive data and must be handled in a private cloud or a public cloud with FHE. As an example, an employee's name, identification and job description may be considered confidential to an organization but the employee's salary and job appraisal would be very sensitive and would need the highest level of protection.

If there is no security marker, the flow moves to the left to the no security marker, box 132. Since there is no encryption required, the flow is to select the public cloud, box 134, or select the private cloud, box 136, whichever is most cost effective. Costs involved here may include the cost to move the data from the local computing system 100 to the public cloud 102 or the private cloud 104 plus the cost of using the resources in the public cloud 102 or the private cloud 104 for computation. After computation in either of the public cloud 102 or the private cloud 104 is selected, the tasks may be processed, box 138.

If the security marker is medium or high security, the flow moves to the right to the medium or high security marker, box 140. From here, the flow moves to the left if there is a medium security marker, box 142, and to the right if there is a high security marker, box 144.

Considering first the flow to the medium security marker, box 142, the flow may be to select the public cloud with SWHE or FHE encryption, box 146, or to select the private cloud with no encryption, box 148, whichever is the most cost effective. Costs involved here may include the cost to move the data from the local computing system 100 to the public cloud 102 or the private cloud 104 plus the cost of using the resources in the public cloud 102 or the private cloud 104 for computation plus the cost of SWHE or FHE encryption if the public cloud 102 is selected. After computation in either of the public cloud 102 or the private cloud 104 is selected, the tasks may be processed, box 138.

Considering now the flow to the high security marker, box 144, the flow may be to select the public cloud with FHE encryption, box 150, or to select the private cloud with no encryption, box 152, whichever is the most cost effective. Costs involved here may include the cost to move the data from the local computing system 100 to the public cloud 102 or the private cloud 104 plus the cost of using the resources in the public cloud 102 or the private cloud 104 for computation plus the cost of FHE encryption if the public cloud 102 is selected. After computation in either of the public cloud 102 or the private cloud 104 is selected, the tasks may be processed, box 138.

Figure 5:
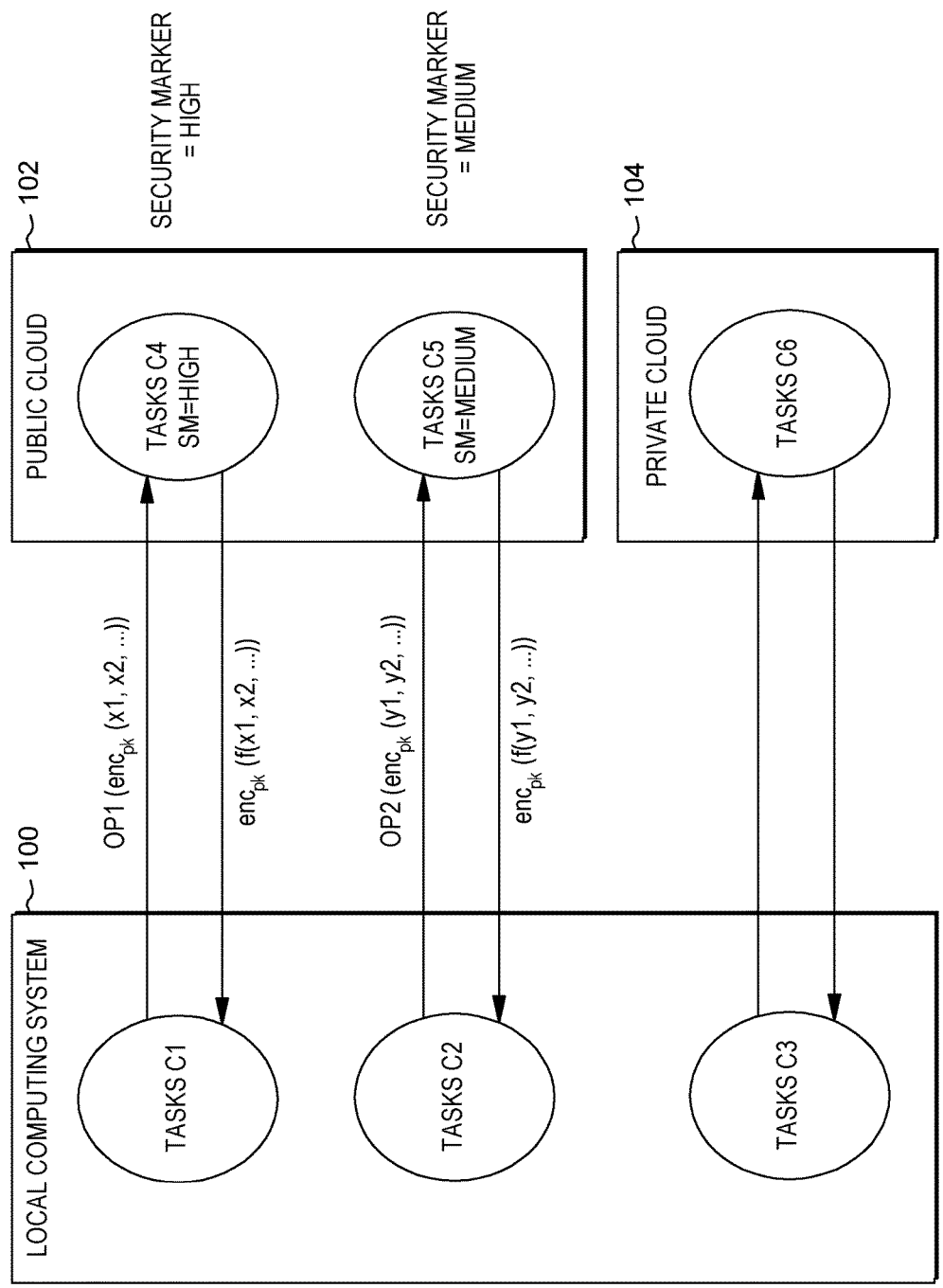
FIG. 5 depicts an example of dividing tasks between a public cloud and a private cloud.

Referring now to FIG. 5, there is illustrated a hypothetical example for dividing clusters of tasks C1 to C6 between the local computing system 100, the public cloud 102 and the private cloud 104. The costs specified are not actual costs and are only for the purpose of illustrating the process flow of the exemplary embodiments.

For the purpose of the example, the following assumptions are made:

The costs of running the clusters of tasks C1, C2, C3, C4, C5 and C6 in the local computing system 100 are $100, $150, $200, $350, $250, $150, respectively, and the transition cost of moving the clusters of tasks C1, C2, C3, C4, C5 and C6 to a cloud environment, whether the public cloud 102 or the private cloud, are $10, $15, $20, $20, $15 and $15, respectively.

The processing cost of the clusters of tasks C1, C2, C3, C4, C5, C6 in the public cloud are $100, $150, $200, $200, $150 and $250, respectively.

FHE security in the public cloud costs $75 and SWHE security in the public cloud 102 costs $50.

The local computing system 100 includes clusters of tasks C1, C2 and C3. Compared to the combined costs of running tasks C1, C2 and C3 in the public cloud 102 and the transition costs to the public cloud 102 and considering that clusters of tasks C1, C2 and C3 do not have any security markers, the job scheduler/analyzer 116 has determined that it is most cost effective to run the clusters of tasks C1, C2 and C3 on the local computing system 100.

Task cluster C4 may have a high security marker. The job scheduler/analyzer 116 has read the high security marker and knowing that if the task cluster C4 is outsourced to the public cloud 102, FHE will be required. The cost for FHE is $75. Running the task in the private cloud would cost $350. The combined costs of transition cost, public cloud cost and FHE is $295 which is less than running task cluster C4 in the private cloud 104 or the local computing system 100. Accordingly, the job scheduler/analyzer 116 determines that it is most cost effective to have task cluster C4 processed by the public cloud 102 with FHE. Encrypted data is sent to task cluster C4 so that task cluster C4 can perform some operation ("OP1") on the encrypted data without decrypting the data. After processing the encrypted data, task cluster C4 sends the encrypted resultant function back to task cluster C1.

Task cluster C5 may have a medium security marker. The job scheduler/analyzer 116 has read the medium security marker and knowing that if the task cluster C5 is outsourced to the public cloud 102, SWHE or FHE will be required. Since task C5 has a medium security marker, it is better to run this task in the public cloud 102 with SWHE or FHE. Considering the cost of SWHE is $50 and FHE is $75, it is better to go with SWHE. The combined costs of transition cost, public cloud cost and SWHE is $215 which is less than running task cluster C5 in the private cloud 104 or the local computing system 100. The job scheduler/analyzer 116 determines that it is most cost effective to have task cluster C5 processed by the public cloud 102 with SWHE. Encrypted data is sent to task cluster C5 so that task cluster C5 can perform some operation ("OP2") on the encrypted data without decrypting the data. After processing the encrypted data, task cluster C5 sends the encrypted resultant function back to task cluster C2.

Task cluster C6 may have a security marker but its level is not important since the private cloud 104 may process any data without encryption. Any data received from task cluster C3 may be processed without encryption by task cluster C6 and then the resultant function is sent back to task cluster C3. The combined costs of transition cost and private cloud cost of $175 is $190 which is less than running task cluster C6 in the public cloud 102 or the local computing system 100. Accordingly, the job scheduler/analyzer 116 determines that it is most cost effective to have task cluster C6 processed by the private cloud 104.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A computer-implemented method of allocating tasks in a computing environment comprising:
   receiving a software application for processing, the software application comprising a plurality of tasks;
   splitting the software application into the plurality of tasks;
   selecting a task for processing in a first computing environment without encryption, a second computing environment with homomorphic encryption or a third computing environment without encryption, each of the first computing environment without encryption, the second computing environment with homomorphic encryption or the third computing environment without encryption having a cost associated with processing the task, based on the following algorithm:
   analyzing the plurality of tasks for the presence of a security marker indicating a security level of each of the plurality of tasks;
   when there is no security marker, selecting the task for processing in the first computing environment without encryption or the third computing environment without encryption, whichever has the least cost associated with it; and
   when the security marker is medium or high and the processing of the task involves any computation, selecting the task for processing in the second computing environment with homomorphic encryption or the third computing environment, whichever has the least cost associated with it.

2. The computer-implemented method of claim 1 wherein the first computing environment is a public cloud computing environment, the second computing environment is a public cloud computing environment and the third computing environment is a private cloud computing environment.

3. The computer-implemented method of claim 2 wherein selecting the task for processing further comprising when the security marker is medium or high and the processing of the task involves only storage of the task, selecting the task for processing in the public cloud computing environment with any encryption exclusive of homomorphic encryption or the private cloud computing environment, whichever has the least cost associated with it.

4. The computer-implemented method of claim 2 wherein selecting the task for processing further comprising when there is no security marker and the processing of the task involves only storage of the task, selecting the task for processing in the public cloud computing environment without encryption or the private cloud computing environment, whichever has the least cost associated with it.

5. The computer-implemented method of claim 4 further comprising processing the task in the selected public cloud computing environment or private cloud computing environment.

6. The computer-implemented method of claim 2 wherein selecting the task for processing further comprising when the security marker is medium and the processing of the task involves any computation, selecting the task for processing in the public cloud computing environment with somewhat homomorphic encryption or fully homomorphic encryption or the private cloud computing environment, whichever has the least cost associated with it.

7. The computer-implemented method of claim 2 wherein selecting the task for processing further comprising when the security marker is high and the processing of the task involves any computation, selecting the task for processing in the public cloud computing environment with fully homomorphic encryption or the private cloud computing environment, whichever has the least cost associated with it.

8. The computer-implemented method of claim 2 further comprising processing the task in the selected public cloud computing environment or private cloud computing environment.

9. The computer-implemented method of claim 2 wherein splitting the software application into the plurality of tasks comprising splitting loosely coupled tasks from other loosely coupled tasks and from tightly coupled tasks.

10. A computer program product for allocating tasks in a computing environment, the computer program product comprising a non-transitory computer readable storage medium having program instructions embodied therewith, the program instructions executable by a computer to cause the computer to perform a method comprising:
receiving by the computer a software application for processing, the software application comprising a plurality of tasks;
splitting by the computer the software application into the plurality of tasks;
selecting by the computer a task for processing in a first computing environment without encryption, a second computing environment with homomorphic encryption or a third computing environment without encryption, each of the first computing environment without encryption, the second computing environment with homomorphic encryption or the third computing environment without encryption having a cost associated with processing the task, based on the following algorithm:
analyzing the plurality of tasks for the presence of a security marker indicating a security level of each of the plurality of tasks;
when there is no security marker, selecting the task for processing in the first computing environment without encryption or the third computing environment without encryption, whichever has the least cost associated with it; and
when the security marker is medium or high and the processing of the task involves any computation, selecting the task for processing in the second computing environment with homomorphic encryption or the third computing environment, whichever has the least cost associated with it.

11. The computer program product of claim 10 wherein the first computing environment is a public cloud computing environment, the second computing environment is a public cloud computing environment and the third computing environment is a private cloud computing environment.

12. The computer program product of claim 11 wherein selecting the task for processing further comprising when the security marker is medium or high and the processing of the task involves only storage of the task, selecting the task for processing in the public cloud computing environment with any encryption exclusive of homomorphic encryption or the private cloud computing environment, whichever has the least cost associated with it.

13. The computer program product of claim 11 wherein selecting the task for processing further comprising when there is no security marker and the processing of the task involves only storage of the task, selecting the task for processing in the public cloud computing environment without encryption or the private cloud computing environment, whichever has the least cost associated with it.

14. The computer program product of claim 13 further comprising processing the task in the selected public cloud computing environment or private cloud computing environment.

15. The computer program product of claim 11 wherein selecting the task for processing further comprising when the security marker is medium and the processing of the task involves any computation, selecting the task for processing in the public cloud computing environment with somewhat homomorphic encryption or fully homomorphic encryption or the private cloud computing environment, whichever has the least cost associated with it.

16. The computer program product of claim 11 wherein selecting the task for processing further comprising when the security marker is high and the processing of the task involves any computation, selecting the task for processing in the public cloud computing environment with fully homomorphic encryption or the private cloud computing environment, whichever has the least cost associated with it.

17. The computer program product of claim 11 further comprising processing the task in the selected public cloud computing environment or private cloud computing environment.

18. The computer program product of claim 11 wherein splitting the software application into the plurality of tasks comprising splitting loosely coupled tasks from other loosely coupled tasks and from tightly coupled tasks.

19. A system for allocating tasks in a computing environment comprising:
a first computing environment without encryption;
a second computing environment with homomorphic encryption;
a third computing environment without encryption;
a non-transitory storage medium that stores instructions;
a processor that executes the instructions to perform the following functions:
receive a software application for processing, the software application comprising a plurality of tasks;
split the software application into the plurality of tasks;
select a task for processing in the first computing environment without encryption, the second computing environment with homomorphic encryption or the third computing environment without encryption, each of the first computing environment without encryption, the second computing environment with homomorphic encryption or the third computing environment without encryption having a cost associated with processing the task, based on the following algorithm:
analyze the plurality of tasks for the presence of a security marker indicating a security level of each of the plurality of tasks;
when there is no security marker, select the task for processing in the first computing environment without encryption or the third computing environment without encryption, whichever has the least cost associated with it; and
when the security marker is medium or high and the processing of the task involves any computation, select the task for processing in the second computing environment with homomorphic encryption or the third computing environment, whichever has the least cost associated with it.

20. The system of claim 19 wherein the first computing environment is a public cloud computing environment, the second computing environment is a public cloud computing environment and the third computing environment is a private cloud computing environment.

* * * * *